Figure 1:
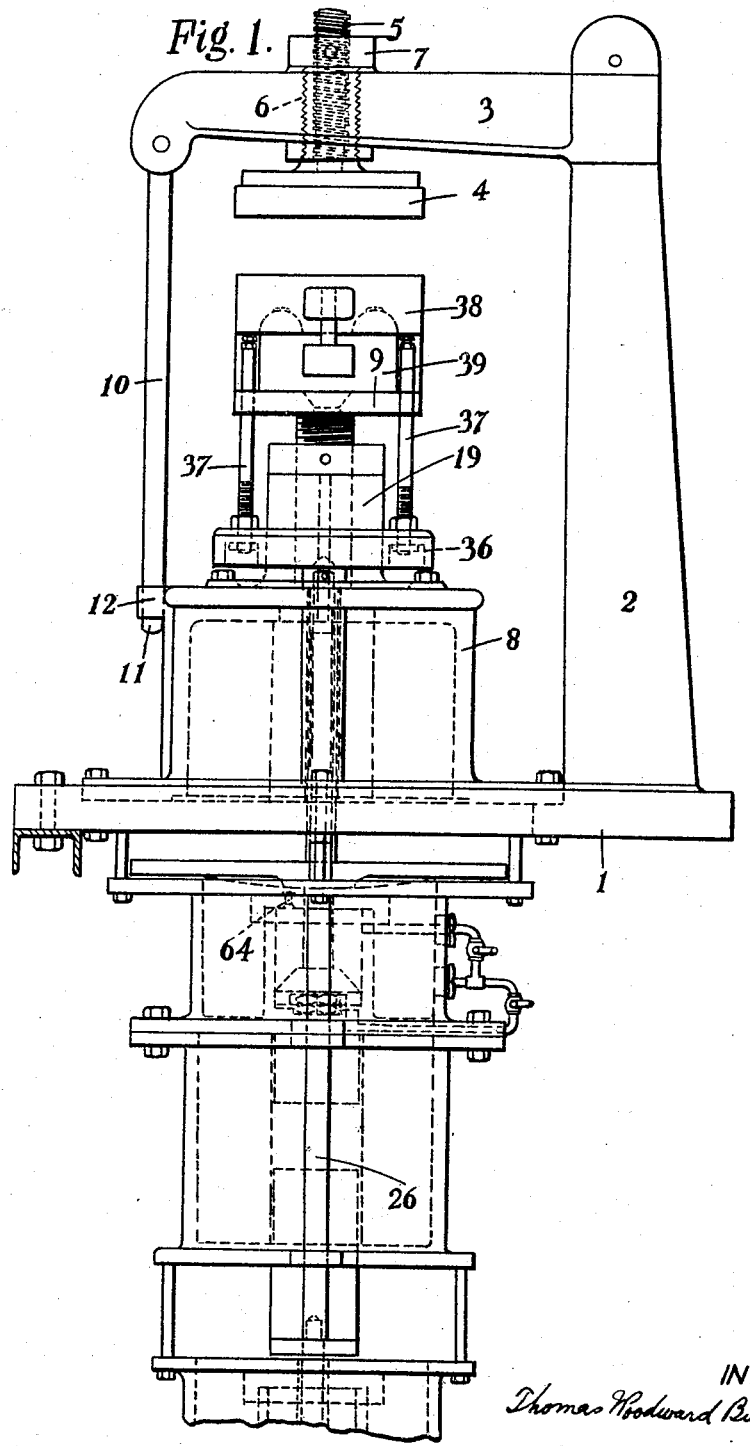

Sept. 22, 1931.  T. W. BULLOCK  1,824,009
FOUNDRY MOLDING MACHINE
Filed Sept. 14, 1929   5 Sheets-Sheet 1

INVENTOR
Thomas Woodward Bullock
BY
Byrnes, Stebbins, Parmelee & Blenko
HIS ATTORNEYS Sept. 22, 1931. T. W. BULLOCK 1,824,009
FOUNDRY MOLDING MACHINE
Filed Sept. 14, 1929 5 Sheets-Sheet 2

INVENTOR
Thomas Woodward Bullock
BY
Byrnes, Stebbins, Parmelee & Blenko
HIS ATTORNEY Sept. 22, 1931.  T. W. BULLOCK  1,824,009
FOUNDRY MOLDING MACHINE
Filed Sept. 14, 1929  5 Sheets-Sheet 3

INVENTOR
Thomas Woodward Bullock
BY
Byrnes, Stebbins, Parmelee & Blenko
HIS ATTORNEYS Sept. 22, 1931.　　　T. W. BULLOCK　　　1,824,009
FOUNDRY MOLDING MACHINE
Filed Sept. 14, 1929　　　5 Sheets-Sheet 5

INVENTOR
Thomas Woodward Bullock
BY
Byrnes, Stebbins, Parmelee & Blenko
HIS ATTORNEYS Patented Sept. 22, 1931

1,824,009

UNITED STATES PATENT OFFICE

THOMAS WOODWARD BULLOCK, OF RAINHILL, ENGLAND, ASSIGNOR TO BRITISH INSULATED CABLES LIMITED, OF PRESCOT, ENGLAND, A BRITISH COMPANY

FOUNDRY MOLDING MACHINE

Application filed September 14, 1929, Serial No. 392,510, and in Great Britain October 1, 1928.

This invention relates to foundry molding machines in which the molding material (sand) is consolidated by the action of directly applied pressure as distinguished from jolting machines in which the pressure is due to the sudden retardation of the moving sand. Power operated foundary molding machines of this kind generally work with hydraulic or pneumatic power which involves the installation, working and upkeep of appropriate pressure producing plant and other difficulties associated with these types of power mechanisms. By the present invention we provide an improved arrangement of power operated molding machine whereby it is made possible to obtain direct actuation from electric supply mains without any intermediate transformation of energy, either within the machine or external to it, and whereby the disadvantages due to wear of packing and other parts and due to the effects of temperature on the working fluid are avoided. In accordance with the invention we attain the desired results by producing the movement of the pressure member relative to the presser head under the combined action of an electromagnet and armature or a solenoid and core (referred to in the following specification and claims as an electro-magnetic device) and a fluid friction braking device such as a dashpot.

In pressure actuated molding machines working hydraulically or pneumatically the rate of movement both in the pressing and in the reverse directions is continuously under control by the setting or dimensions of the valve or passage which admits the fluid pressure to the actuating cylinder. There is no such method of control available in an electro-magnetically actuated pressure molding machine and the course followed by the variation of the force exerted electro-magnetically as the stroke proceeds is materially different from the course of variation followed by the static resistance due to weight and sand pressure offered by the molding operation. They are also obvious differences in these two variations during the reverse stroke. The excitation must be set at a value which will provide the maximum pressure which is required at the end of the stroke and the excitation very rapidly reaches this value after the current has been switched on. The present invention by combining the fluid friction brake with the electro-magnetic device produces actuating means which avoid the defects indicated and behave in a manner particularly appropriate for the object in view. Accordingly the machine does not present any abnormal operating characteristics and can be readily manipuated by a workman who is accustomed to hydraulically or pneumatically actuated molding machines.

The particular arrangement in which this combination is embodied is dependent on the type of machine and on the operations to be performed. In general the connection between the fixed part of the molding machine and the stationary part of the solenoid or electro-magnet, and the connection between the pressure applying member or lifting member and the moving part of the solenoid or electro-magnet is made as direct as possible.

Figure 2:
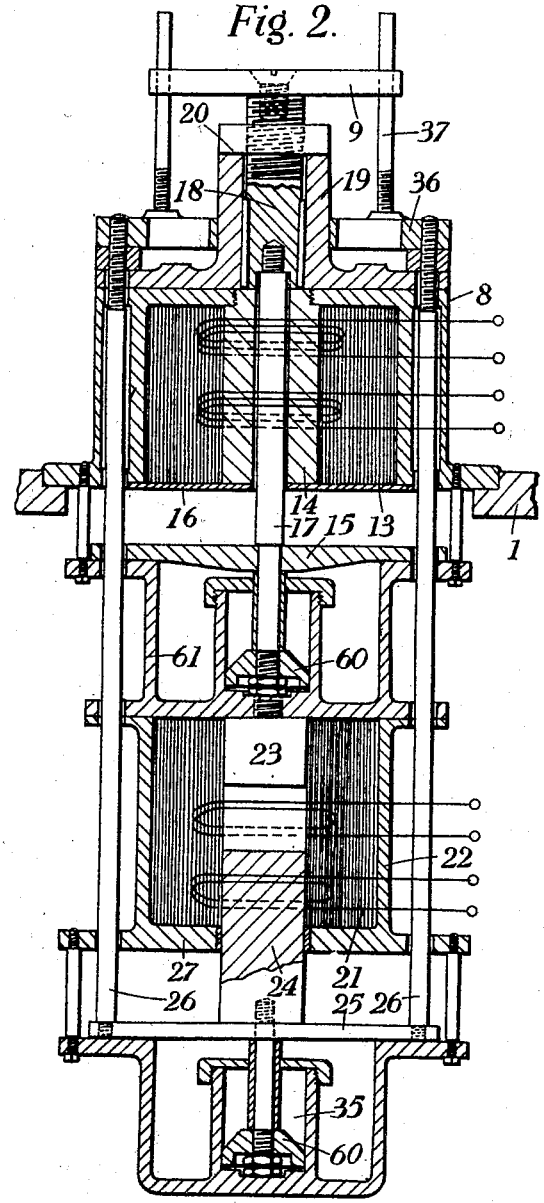
Figure 3:
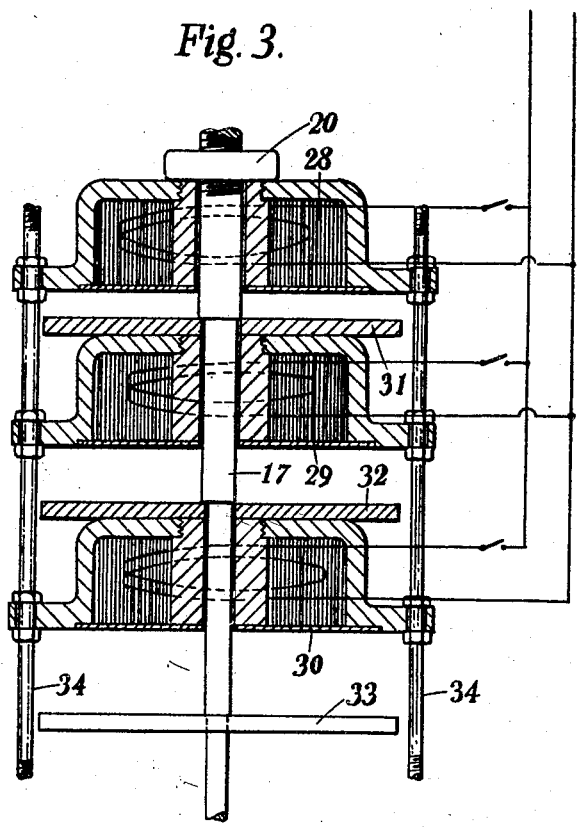
Figure 4:
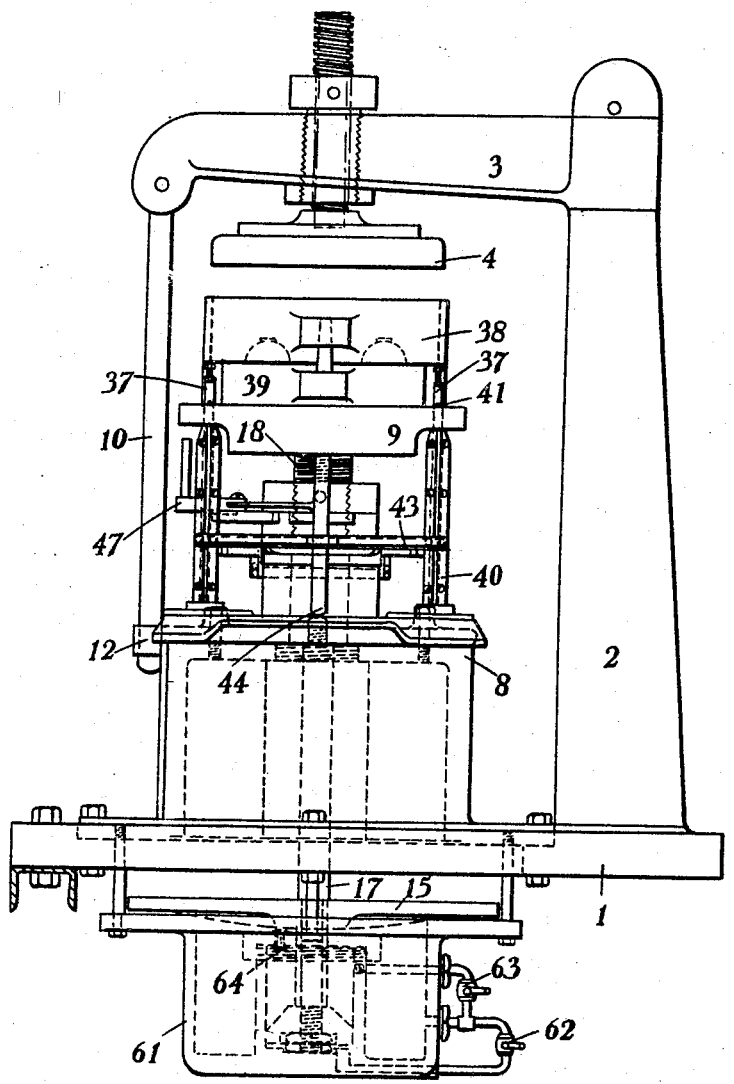
Figure 5:
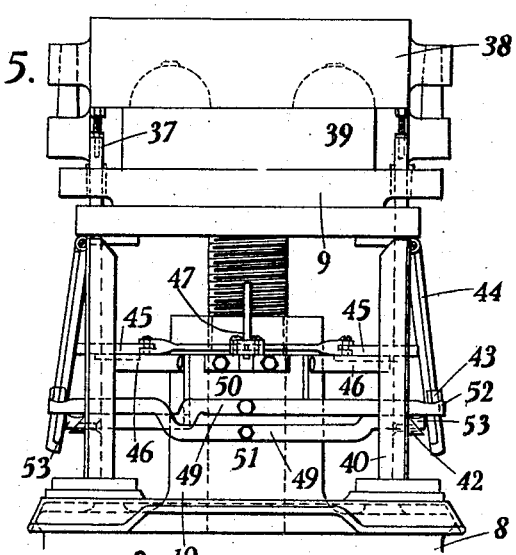
Figure 6:
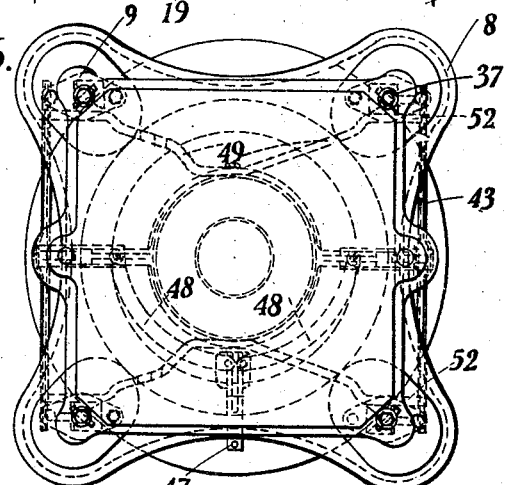
Figure 7:
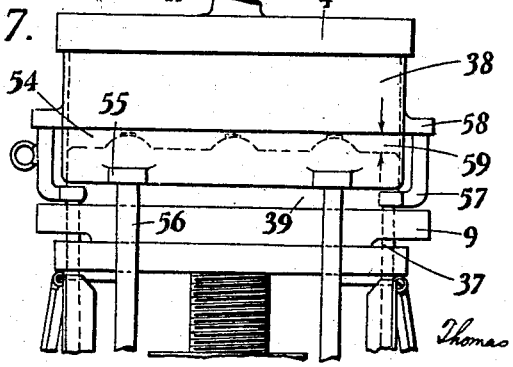

In the following description indication will be given of the way in which the combination can be embodied in practical machines for different purposes, by way of example, reference being made to the accompanying drawings. In these Fig. 1 is a side elevation of one form of the improved molding machine. Fig. 2 is a central vertical section in a plane at right angles to the plane of Fig. 1 of the principal parts of that machine. Fig. 3 shows in central section in a diagrammatic manner an alternative form of electro-magnetic actuating device: Fig. 4 shows in side elevation an alternative form of machine: Fig. 5 shows a view at right angles to Fig. 4 of part of the mechanism, the rod 10 having been moved aside: Fig. 6 shows a plan view corresponding to Fig. 5 after the pattern plate and molding box have been removed, and Fig. 7 shows a view corresponding to a portion of Fig. 5 embodying an alternative arrangement of certain parts.

The general structure of the machine comprises a foundation member indicated by 1, a vertical frame, shown in the examples as the pillar 2 and swinging arm 3 which turns in a horizontal plane about the upper end of the pillar 2. This frame supports the member which resists the pressure which is exerted electro-magnetically. This member is shown as the presser-head 4, adjustably mounted in the arm 3 and capable of being swung aside from its operative position by the movement of this arm. The adjustment of the head 4 is performed by the travel of the screw-threaded spindle 5 in the socket 6 mounted in the arm 3, the position being fixed by means of the lock-nut 7. The base plate 1 carries the main electro-magnet or solenoid, for instance by means of its housing or shell 8, by which is supported and guided the pressure-applying member, shown as the plate 9, actuated by the electro-magnet or solenoid. The arm 3 is partly supported and is held in position by the tie-rod 10, the lower end of which has lateral projection 11 engaging under a pair of lugs 12 projecting from the housing 8. When the machine is not under pressure the rod 10 can be swung outward and then the arm 3 can be swung horizontally, carrying the presser-head 4 clear of the mould.

The dashpots used to control the movement of the electro-magnet device will comprise a piston 60 working in a closed cylinder so as to give a controlling effect both on the up-stroke and on the down-stroke. Where adjustment of the control is not required the braking effect may be obtained by a leakage passage or passages in the piston. The dashpot cylinder is preferably placed in an oil chamber 61 in which the cylinder is submerged in the oil and an automatic valve is preferably provided in each end of the cylinder to permit the inflow of oil to make up for any loss. Where variation in control is required it may be carried out by an arrangement of adjustable valves such as shown in Fig. 1 and Fig. 4. Here there are two valves 62 and 63 placed in pipes which connect respectively with the bottom and top of the cylinder and also connect together, between the valves and to the interior of the oil chamber 61. The valve 62 is mainly effective for the control of the descent of the pressure plate and associated parts, while valve 63 mainly influences the rise of these parts. One of the automatic valves previously mentioned is indicated at 64.

The adjustability of control is mainly required in connection with the rate of ascent. Less braking effect is required for moulds having a great depth of sand than for relatively shallow moulds.

The main electro-magnetic device will first be considered. The type of device used depends to a certain extent on the work to be performed. Where the working of the molding machine involves the repetition of a single movement with a stroke of moderate length, an appropriate arrangement is produced by utilizing an electro-magnet with a fixed part mounted in the base of the machine, as indicated by 8, and with the moving part acting directly upon the pressure plate 9. Such an arrangement is shown in Fig. 2 where the electro-magnet winding 13 is located in the housing 8 which also forms part of the magnetic circuit. This circuit also includes the central core 14 and the disc armature 15. The winding 13 is enclosed at the lower end by a plate 16 of brass or other non-magnetic material. The armature 15 is mounted on the spindle 17 which is preferably made of non-magnetic material. This spindle is connected at its upper end with the column 18 which carries the pressure plate 9. This column is guided in the cylinder 19 by the keys and keyways shown and has on its upper part a nut 20 which determines the position of the plate 9 and armature 15 at the lower end of the stroke.

For operations requiring a longer stroke the solenoid form of construction may be used. In some cases the construction may be such that during the first part of the stroke the device works mainly as a solenoid by the attraction of a core working within the coil and at or near the end of the stroke additional pressure can be obtained by the direct attraction between an armature which moves with the core so that at the last stage of the movement it closes or nearly closes a gap in the iron of the magnet circuit.

A solenoid arrangement is shown in the lower part of Figs. 1 and 2 where it is used for giving movement to the gear for separating the pattern from the mould. A similar arrangement could however be employed as the main electro-magnetic device. In the arrangement illustrated in the lower part of Figs. 1 and 2 the exciting winding 21 is housed in a casing 22 which also forms part of the magnetic circuit. This circuit includes the fixed core 23 and the movable core 24. The core 24 is attached to the cross arm 25 to which are connected the upwardly extending side rods 26, the action of which will be hereafter described. In order to combine the kinds of action which are typical of solenoids and electro-magnets, as above mentioned, the cross arm 25 can be replaced by a disc of iron or steel, and the iron of the lower part 27 of the housing for the coil 21 can be cut away and replaced by non-magnetic material. Such an arrangement is not advantageous in a magnet for separating the pattern from the mould but may be advantageous in a pressure-applying magnet where the resistance to compression increases as the upper end of the stroke is approached.

The utilization of the characteristics of electro-magnetically actuated devices, which give an increasing pressure as the stroke proceeds, is an important advantage of the present invention.

For working with particularly long strokes a core travelling inside a sectional solenoid coil can be used in combination with a switch which varies the sections which are in circuit as the core moves. With this arrangement, at the commencement of the stroke the core would be near one end of the coil and the sections at that end would be put into circuit, and as the core moves towards the other end of the coil the sections extending towards that end will be put into circuit in succession; this may be accompanied by the cutting out of circuits from the starting end. The switch for bringing about the progressive energizing of such a sectionalized coil can be under hand control, or can be actuated automatically by the movement of the core.

In the example illustrated in the lower part of Fig. 2 the winding is indicated diagrammatically as being formed of two sections located one above the other. These can be used in succession as just mentioned. In general, however, with the proportions shown, such an arrangement has little advantage. It becomes of importance where a relatively longer stroke is required when a greater number of sections than two would have to be employed. The sectionalizing of the coil in the example illustrated is primarily of advantage in permitting variation of the strength of the force exerted by the solenoid to suit different conditions of operation. Either of the coils may be employed separately or two of them can be arranged in series or in parallel.

In another arrangement for use where a long stroke is required a number of electro-magnets may be utilized in succession. An arrangement of this kind is indicated diagrammatically in Fig. 3.

The three electro-magnets, 28, 29 and 30 there shown, are arranged so that at the commencement of the stroke (which is the position illustrated), the gaps between the armatures 31, 32 and 33 and the cores of the electro-magnets have different lengths, being for instance two inches for magnet 28, four inches for magnet 29 and six inches for magnet 30. The electro-magnets are mounted on rods 34 which are attached to the base of the machine. During the initial part of the stroke the magnet 28 having the shortest gap will provide the main part of all of the actuating force which lifts the spindle 17, to which the pressure plate is attached. This spindle rests on the three armatures 31, 32 and 33 by means of the shoulders indicated, but is free to move away from the armatures in an upward direction. Accordingly when the armature 31 has completed its stroke the spindle 17 can be carried upward by the action of the armatures 32 and 33, which become more effective after the action of the armature 31 has reduced their gaps. Similarly when armature 32 has completed its stroke, armature 33 can continue to impart upward movement to the spindle 17.

In the arrangement for separating the pattern from the mould employed in the machine illustrated in Figs. 1 and 2, the separating movement is derived from a separate electro-magnetic device, as previously indicated, which imparts upward movement to side-rods 26 which fall back under the influence of gravity when the excitation is cut off from the coils of the solenoid 22, the downward movement being controlled by the dashpot 35. The side-rods 26 are attached at their upper ends to a frame 36 which carries four lifting stools 37 adapted to engage under the corners of the molding box shown at 38 in Fig. 1, or under projections on this box. The stools 37 may, as shown in Fig. 1, be provided with adjustable tips so that they may be made to bear equally on the box and thus lift it without tilting. These stools 37 pass through holes or slots in the outer part of the pressure plate 9.

In the operation of the machine the pattern plate shown at 39 in Fig. 1 rests on the pressure plate 9 and over it is placed the molding box 38 which rests on the stools 37 in the position shown in Fig. 1, which is the position of rest of the machine. When preparing to make the mould the molding box is filled with sand with a sufficient excess above the top of the box, an enclosing frame for this excess being used if required. The main electro-magnet 8 is then energized and the pressure plate 9 is raised, taking with it the pattern plate 39 and the box 38 which is lifted clear of the stools 37. This lifting brings the upper surface of the sand into contact with the pressure head 4 and the continued movement causes the sand to be compressed into the molding box to form the mould. After the pressing is complete the electro-magnet 8 is de-energized and the pressure plate 9 falls back, carrying with it the pattern plate and the molding box to the position of rest. The rod 10 can then be swung out of engagement with the lugs 12 and the pressure head can be moved aside. Then the stripping solenoid 22 is energized and the core 24 is lifted, raising the side rods 26 and the frame 36 and stools 37. These lift the molding box 38 clear of the pattern, whereupon the box can be taken from the machine, after which the stools 37 are lowered again by their weight and that of the associated parts when the solenoid 22 is de-energized. The machine is then in a position for the repetition of the procedure.

An alternative form of gear for separating the pattern from the mould is shown in Figs. 4, 5 and 6. Here the second electromagnetic device is dispensed with, the separating being obtained from the weight of the pressure plate 9, column 18, armature 15 and the parts which move with them.

In this case also there are four lifting stools 37 which project through apertures in the pressure plate 9. These stools are however formed so as to slide within pillars 40 mounted on the housing 8 of the electro-magnet. The stools 37 have near their upper ends projecting pins 41 which rest upon the plate 9. At their lower ends these stools 37 have catches 42 projecting through slots in the pillars 40. From this arrangement it follows that the stools 37 move up and down with the plate 9 provided that no obstructions are placed in the paths of the catches 42. Such obstructions can however be provided by bars 43 which are carried on swing levers 44 which hang down from opposite sides of the pressure plate 9. These levers 44 are normally held in the position shown in Figs. 5 and 6 by the rods 45 which work on slides 46 and are controlled by the handle 47 through the links 48. This handle 47 lies directly behind the tie-rod 10 and cannot be drawn to its outer position until this rod has been released from the lugs 12 and swung aside with the pressure-head 4. When this has been done the handle 47 can be drawn out and this through the links 48 causes the rods 45 to slide inwards and allow the levers 44 to fall into a vertical position until the bars 43 lie in the paths of the catches 42. These bars 43 are mounted on their levers 44 so as to be capable of sliding along them, and their position is controlled by a pair of forked levers 49 which are pivotally mounted on the part 19 at 50 and 51. The double ends 52 of these levers engage under the bars 43 as previously indicated. Their single ends 53 are so placed that, when the levers 44 have been carried upward by the movement of the pressure plate 9 and have been allowed to swing inwards by the pulling out of the handle 47, the lower ends of these swinging levers lie above the single ends 53 of the forked levers 49.

The procedure with this arrangement is to raise the pressure plate 9 with the pattern 39 and mould 38 for the purpose of pressing the sand into the mould from above by the action of the presser head 4 and then lowering the parts together, swinging the presser head aside; raising the pressure plate 9 with pattern and mould, a second time pulling the handle 47 into the outer position, then allowing the pressure plate 9 to descend with the pattern again. At this second descent the lower ends of the swinging levers 44 press upon the single ends 53 of the forked levers 49 and cause the double ends 52 of these levers to lift the bars 43 which then lie under the catches 42 attached to the lifting stools 37. Accordingly the descent of the parts associated with the pressure plate 9 causes the lifting of the stools 37, which take with them the mould 38. By this means a large movement of separation between the pattern and mould can be obtained, which is essential in the case of deep moulds. The extent of this separation can be adjusted when building the machine by the appropriate selection of the location of the pivots 50 and 51 of the forked levers. In the example illustrated they give a one to one leverage; it would however be possible to arrange them so that the lift imparted to the stools 37 is greater than the descending stroke of the pressure plate 9.

Where only a short separating movement is required, it would be possible to obtain it without utilizing the forked levers or their equivalents. It would simply be necessary to provide that the bars 43 or their equivalent are carried from the fixed part 8 of the machine and swung under the catches 42 when the plate 9 with the parts carried by it are in their top positions. Then, when these parts descend, the catches are held in their raised positions and the stools 37 hold up the molding box 38 while the plate 9 with the pattern descend. This would give a distance of separation not greater than the stroke of the plate 9. With the mechanism illustrated the separation is equal to twice this stroke and can be made greater if the pivots 50 and 51 are appropriately placed.

In the preceding description we have considered the case of molding procedure in which the pattern plate and molding box are lifted together, the surplus sand which is to be pressed into the molding box being placed between this box and the presser head 4. When dealing with the case of downsand frame molding in which the molding box is initially placed in contact with the presser head and the surplus sand is placed below the box and between it and the pattern plate, being enclosed by a frame called the down-sand frame, a somewhat different arrangement is necessary in order to obtain appropriate stripping action. The modification is indicated in Fig. 7. In this case the pattern plate 39 as before rests on the pressure plate 9; the molding box 38 is however placed in contact with the presser head 4 and the space between this box and the pattern plate is enclosed by the down-sand frame 54. This frame has laterally projecting lugs 55 through which it is carried by pillars 56, the lower ends of which (not shown) are mounted on the top of the housing 8. The stools 37 terminate at their upper ends in swivel angle brackets 57 which can either stand in the position shown in Fig. 7, where their upper ends are under lugs 58 on the molding box 38, or can be swung about the ends of the stools 37 horizontally so as to lie clear of the molding box. They occupy the latter position during the pressing operation in which the pattern plate is moved up through the distance indicated by 59. This completes the making of the mould, after which the pressure plate 9 and the pattern plate 39 descend to the position shown in Fig. 7, the molding box being sustained by the down-sand frame 54 and the pillars 56. The swivel angle brackets 57 are then swung into the position shown and the presser head is swung aside. The next upward movement of the plate 9 carries the molding box up with it, the pattern thus being prevented from coming into contact with the sand a second time. The separating can then be completed in the manner described in connection with Figs. 4, 5 and 6, the stools being caused to move upwards or retained in the raised position while the plate 9 and the pattern 39 descend to the position of rest.

Both methods of separating patterns from the mould by the action of the descent of the pressure plate may be applied to molding machines in which the pressing effect is obtained otherwise than electro-magnetically.

What I claim as my invention and desire to secure by Letters Patent is:—

1. A foundry molding machine in which the sand is consolidated by directly applied pressure, comprising two relatively movable members adapted to apply pressure to a mould placed between them and means for imparting pressure and relative movement to said members at an automatically controlled rate, said means comprising an electro-magnetic device and a fluid friction braking device operatively associated together.

2. A foundry molding machine in which the sand is consolidated by directly applied pressure comprising a presser head and a pressure member between which the mould and pattern are compressed, an electro-magnetic actuating device, means for operatively connecting said device with said head and said member, and a regulatable dashpot connected with the pressure member and controlling the rapidity of its working stroke.

3. A foundry molding machine in which the sand is consolidated by directly applied pressure, comprising separate means for engaging the mould and pattern respectively, actuating means for producing relative motion between said two engaging means, said actuating means consisting of a two-part electro-magnetic device, means for operatively connecting each one of said parts with one of said engaging means and a fluid friction brake controlling the rapidity of movement of said device.

4. A foundry molding machine in which the sand is consolidated by directly applied pressure comprising a presser head and a pressure member between which the mould and pattern are compressed, said pressure member serving for the support of the pattern, means for supporting the mould, an electro-magnetic device, means for operatively connecting said device with said head and said member for the production of relative motion between these parts, a second electro-magnetic device, means for operatively connecting said second device with the pressure member and with the means for supporting the mould so that the said device may produce relative motion between these parts for separating the mould from the pattern.

5. A foundry molding machine in which the sand is consolidated by directly applied pressure comprising a presser head and a pressure member adapted to carry the pattern and mould, means for exerting pressure by said member upon the pattern and mould placed between it and the presser head and the means for separating the mould from the pattern during a return stroke of the pressure member, said means comprising a transmission device adapted to be put into operation between the pressure member and one of the parts to be separated and to give that part a movment in the sense opposite to that of the pressure member, which carries with it the other part.

6. In a foundry molding machine in which the sand is consolidated by directly applied pressure and comprising a separating arrangement as set out in claim 5, the formation of this separating device by means of a pair of pivotal levers, means for applying to one end of each of the said levers a movement corresponding to the return movement of the pressure member, means for bringing the said applying means into and out of action at will, and means for transmitting from the other end of said levers to one of the parts carried by the pressure member a movement in a sense opposite to that of the pressure member.

In testimony whereof I affix my signature.

THOMAS WOODWARD BULLOCK.